(12) United States Patent
Ho

(10) Patent No.: US 7,634,669 B2
(45) Date of Patent: Dec. 15, 2009

(54) METHOD OF POWER MANAGEMENT OF A CENTRAL PROCESSING UNIT CONNECTING WITH A PLURALITY OF HOST BRIDGES

(75) Inventor: Kuan-Jui Ho, Hsin-Tien (TW)

(73) Assignee: Via Technologies, Inc., Taipei County (TW)

( * ) Notice: Subject to any disclaimer, the term of this patent is extended or adjusted under 35 U.S.C. 154(b) by 580 days.

(21) Appl. No.: 11/316,708

(22) Filed: Dec. 27, 2005

(65) Prior Publication Data

US 2006/0294404 A1    Dec. 28, 2006

(30) Foreign Application Priority Data

Jun. 28, 2005    (TW) ................ 94121681 A

(51) Int. Cl.
    *G06F 1/32*    (2006.01)
(52) U.S. Cl. ............................................ 713/300
(58) Field of Classification Search .................. 713/300
    See application file for complete search history.

(56) References Cited

U.S. PATENT DOCUMENTS 6,070,215 A * 5/2000 Deschepper et al. ........ 710/309
6,079,022 A * 6/2000 Young .......................... 713/300
6,125,450 A * 9/2000 Kardach ...................... 713/323
7,155,618 B2 * 12/2006 Moyer et al. ................. 713/320

FOREIGN PATENT DOCUMENTS

TW            528945          4/2003

OTHER PUBLICATIONS

Hamacher, C., et al.; "Computer Organization"; McGraw-Hill Companies, Inc.; 2002; pp. 216 and 217.

* cited by examiner

*Primary Examiner*—Thomas Lee
*Assistant Examiner*—Eric Chang
(74) *Attorney, Agent, or Firm*—Rosenberg, Klein & Lee

(57) ABSTRACT

A method of power management of a CPU connects to a plurality of host bridges. The method is applied to a CPU connecting to the host bridges. When the host bridges are detected as no bus master signal being received, a command is transmitted to force the host bridges not to transmit the bus master signal to the CPU when they receive the bus master signal. After the CPU enters the C3 state, if the host bridges are detected that any one of the host bridges receives the bus master signal, the CPU is forced to quit the C3 state, and the host bridges are forced to transmit the bus master signal to the CPU.

19 Claims, 4 Drawing Sheets

METHOD OF POWER MANAGEMENT OF A CENTRAL PROCESSING UNIT CONNECTING WITH A PLURALITY OF HOST BRIDGES

FIELD OF THE INVENTION

The present invention relates to a method of power management of a central processing unit (CPU), and more particularly to a method of power management of a CPU connecting with a plurality of host bridges in order to achieve the purpose of saving power by means of making the CPU be able to enter the C3 power management state of the Advanced Configuration and Power Interface (ACPI).

BACKGROUND OF THE INVENTION

Computer systems have been indispensable basic living tools for modern people. They have been developed for almost seventy years, and are developed especially rapidly in recent ten years. Nowadays, because of their powerful functions, the power consumption of computer systems increases as well. Accordingly, the power management of computer systems is an important index of computer system development. In order to enhance power usage efficiency of computer systems, Microsoft Corporation has ever developed the Advanced Power Management (APM) to enhance power usage efficiency. However, because the APM does not execute power management actions according to a user's usage state, the purpose of using power efficiently cannot be achieved. In consideration of the concern, three major computer system providers, including Intel, Microsoft, and Toshiba, collaboratively laid down the ACPI as a standard for power management. The ACPI employs operation systems of computer systems to perform power management of computers.

Because a user controls a computer system by means of an operating system, the operating system can perform more efficient power management according to the user's usage state, and the user can employ the operating system to achieve usage convenience by adjusting the ACPI directly as well. The function states of the ACPI include global system states (G), device states (D), sleeping states (S), and CPU states (C).

Owing to the demanding requirements by people for the functions of a computer system, the traditional deployment of a CPU applying single host bridge cannot enhance functions of the computer system. Thereby, currently the direction of development for the majority of computer systems aims at the application of a plurality of host bridges by a CPU. However, a CPU provided with a plurality of host bridges cannot enter the C3 state of the CPU state of the ACPI, because before making the CPU enter the C3 state, it is necessary to stop the host bridges from transmitting bus master signals to the CPU when the host bridges are receiving the bus master signals. Nevertheless, because a computer system can only transmit a command to a host bridge, the other host bridges cannot receive the command. As a result, when the CPU enters the C3 state, the other host bridges still transmit the bus master signals to the CPU as they receive the bus master signals, which will cause problems.

Consequently, at present, a computer system whose CPU is provided with a plurality of host bridges doesn't support its CPU to enter the C3 state, which prevents the CPU from providing perfect power management capability. Because the C3 state is the most power-saving state of a CPU, the CPU cannot enter the most efficient sleeping state even though it is in the idle time, which will result in consumption of power. This problem is particularly important for portable computers because it will consume the power of batteries, and thus lowers the usage performance of the portable computers.

The present invention provides a method of power management of a CPU connecting with a plurality of host bridges aimed to solve the problem as describe above. The method not only can improve the drawback of rapid power consumption due to inability to enter the C3 state of a CPU, but also can further reduce the charging frequency required by batteries of portable computers, and thereby increase the battery life.

SUMMARY

The major purpose of the present invention is to provide a method of power management of a CPU connecting with a plurality of host bridges. By forcing another host bridge to stop transmitting bus master signals to the CPU when a host bridge is receiving a command to stop transmitting bus master signals to the CPU, the bus master signals can be prevented from being transmitted to the CPU. Thereby the CPU can enter the C3 state of the ACPI, and the purpose of saving power can be achieved.

The method of power management of a CPU connecting with a plurality of host bridges provided by the present invention is applied to a CPU connecting with the host bridges. When the host bridges are detected as no bus master signals being received, a command is transmitted to a first host bridge of the host bridges in order to force the first host bridge not to transmit the bus master signals to the CPU when the first host bridge receives the bus master signals, and a control signal is transmitted to a second host bridge of the host bridges in order to force the second host bridge not to transmit the bus master signals to the CPU as well when the second host bridge receives the bus master signals. Finally, the CPU is forced to enter the C3 state of the ACPI to reduce power waste. After the CPU enters the C3 state, if the host bridges are detected that any one of the host bridges receives bus master signals, the CPU is forced to quit the C3 state, and the host bridges are forced to transmit the bus master signals to the CPU in order to process the bus master signals.

The present invention provides another method of power management of a CPU, which is applied to a CPU with a shared bus, and the first host bridge as well as the second host bridge is connected to the shared bus. When the host bridges are detected as no bus master signals being received, a command is transmitted to the first host bridge in order to force the first host bridge not to transmit the bus master signals to the CPU, and the second host bridge detects the command via the shared bus and is forced not to transmit the bus master signals to the CPU when it receives the bus master signals. Finally, the CPU is forced to enter the C3 state of the ACPI. After the CPU enters the C3 state, if the host bridges are detected as any one of the host bridges receives bus master signals, the CPU is forced to quit the C3 state, and the host bridges are forced to transmit the bus master signals to the CPU in order to perform processing.

In order to make the structure and characteristics as well as the effectiveness of the present invention to be further understood and recognized, the detailed description of the present invention is provided as follows along with preferred embodiments and accompanying figures.

DETAILED DESCRIPTION

Figure 1:
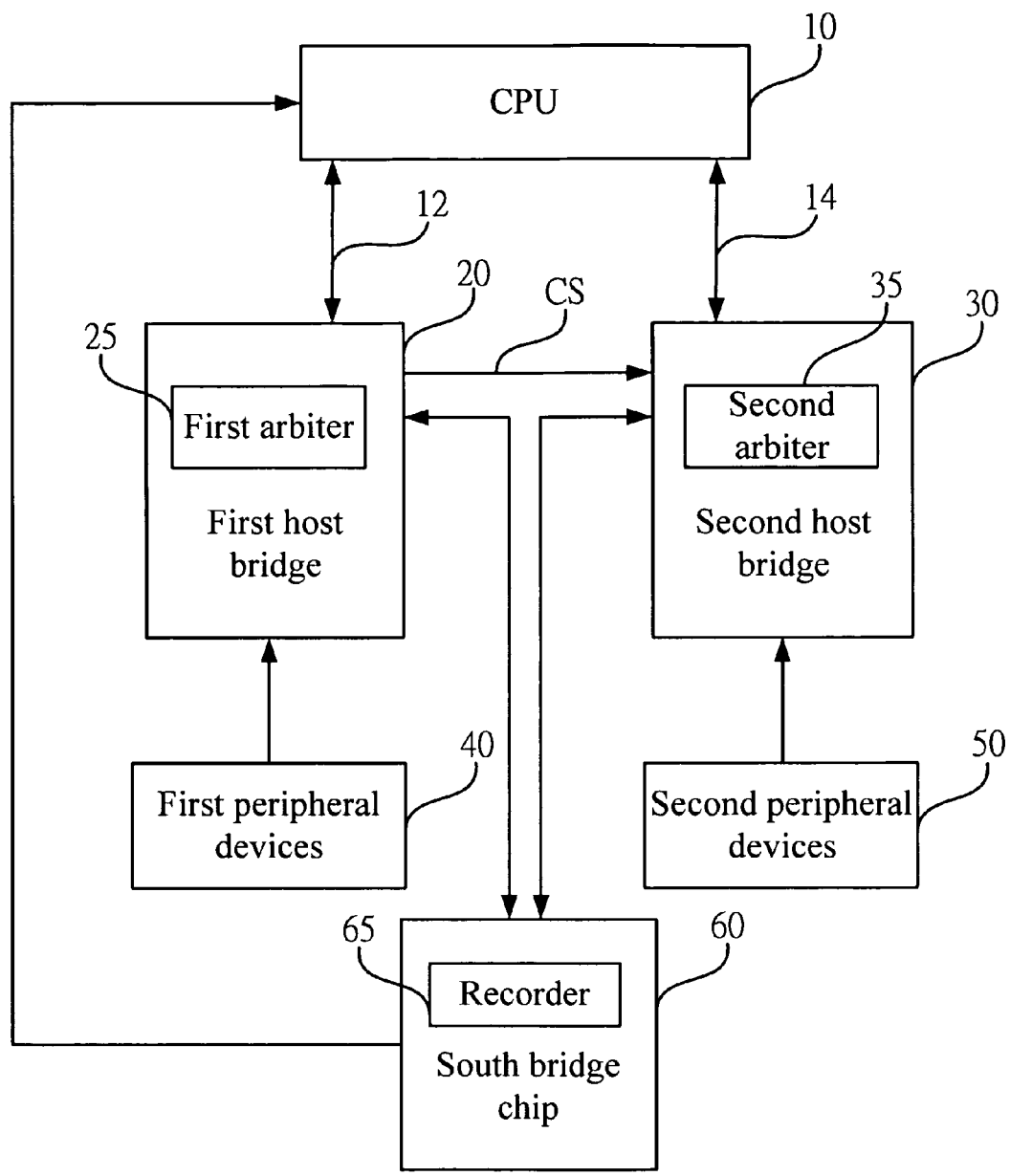
FIG. 1 shows a block diagram of a preferred embodiment according to the present invention.

Please refer to FIG. 1. The present invention is applied to a computer system with its CPU connecting to a plurality of host bridges. As shown in the figure, a CPU 10 is provided with two independent buses 12, 14 connecting to a first host bridge 20 and a second host bridge 30, respectively. The first host bridge 20 connects to a plurality of first peripheral devices 40, and it is provided with a first arbiter 25. The second host bridge 30 connects to a plurality of second peripheral devices 50, and it is provided with a second arbiter 35. The first arbiter 25 and the second arbiter 35 are used to arbitrate the bus master signals transmitted by the first peripheral devices 40 and the second peripheral devices 50, respectively. The arbiters transmit the bus master signals sent by the peripheral devices to the CPU 10 for further processing. That is to say, the bus master signals sent by the first peripheral devices 40 have to be arbitrated by the first arbiter 25 of the first host bridge 20 before the signals can be transmitted to the CPU 10. Similarly, the bus master signals sent by the second peripheral devices 50 have to be arbitrated by the second arbiter 35 of the second host bridge 30 before the signals can be transmitted to the CPU 10.

A recorder 65 is provided in a south bridge chip 60 according to the present invention to record whether the first host bridge 20 and the second host bridge 30 receive the bus master signals transmitted by the first peripheral devices 40 and the second peripheral devices 50. The recorder 65 can be a register. When the first host bridge 20 or the second host bridge 30 receives the bus master signals, a recording signal will be transmitted to the south bridge chip 60 to notify the recorder 65 that one of the two host bridges 20 and 30 has received the bus master signals. The recorder 65 can also be provided in other system chips. According to the present invention, the operating system of a computer system detects the recorder 65 in order to be aware if the first host bridge 20 and the second host bridge 30 receive the bus master signals. Thereby whether the CPU 10 has to enter the C3 state can be determined. If after the operating system has detected the recorder 65 for a period of time and there is no record of bus master signals received by the first host bridge 20 and the second host bridge 30, the operating system will make decision to force the CPU 10 to enter the C3 state.

Figure 2:
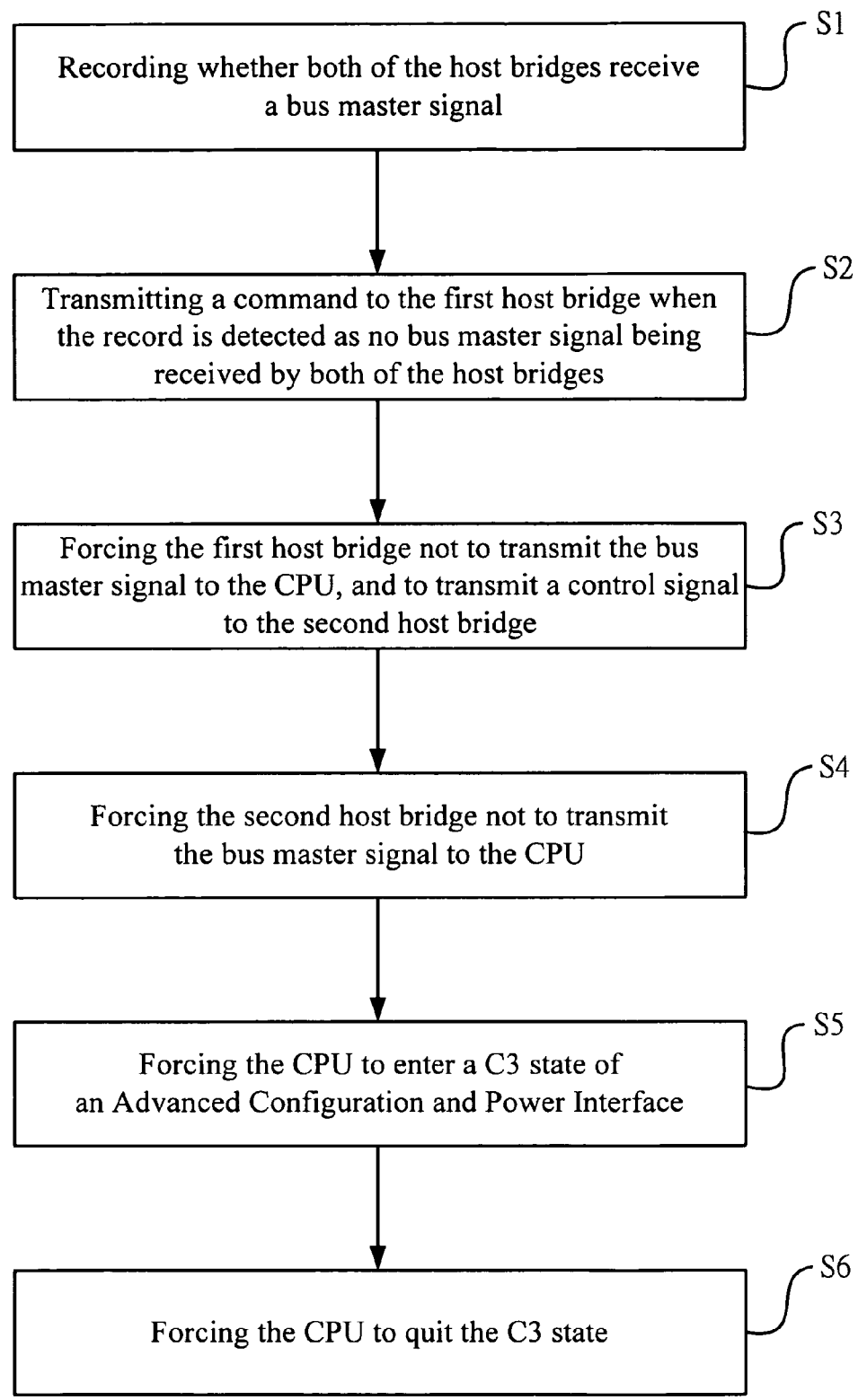
FIG. 2 shows a flowchart of a preferred embodiment according to the present invention.

Please refer to FIG. 2. The figure shows a flowchart of a preferred embodiment according to the present invention. As shown in the figure, the method of power management according to the present invention starts firstly from the step S1, which records whether the first host bridge 20 and the second host bridge 30 receive the bus master signals sent by the first peripheral devices 40 and by the second peripheral devices 50. Afterwards, as shown in the step S2, by detecting the recorder 65 by means of the operating system, it is determined that the CPU 10 can enter the C3 state if both of the first host bridge 20 and the second host bridge 30 do not receive the bus master signals after a period of recording by the recorder 65. Moreover, a command is transmitted to the first host bridge 20 via the operating system. Then, as shown in the step S3, the first host bridge 20 is forced not to transmit the bus master signals to the CPU 10 when the first host bridge 20 receives the bus master signals sent by the first peripheral devices 40. That is, the first host bridge 20 is forced to shut down the first arbiter 25. In addition, the first host bridge 20 also transmits a control signal CS to the second host bridge 30 to execute the step S4.

Afterwards, as shown in the step S4, the second host bridge 30 is forced not to transmit the bus master signals to the CPU 10 when the second host bridge 30 receives the bus master signals sent by the second peripheral devices 50. That is, the second host bridge 30 is forced to shut down the second arbiter 35. The foregoing step S3 and step S4 are used to prevent the bus master signals from being transmitted to the CPU 10 after being arbitrated by the first arbiter 25 and the second arbiter 35. Then, the step S5 is executed to force the CPU 10 to enter the C3 state of the ACPI. The CPU 10 is forced to enter the C3 state of the ACPI by a stop-clock signal (STPCLK) sent by the south bridge chip 60 after the south bridge chip 60 receives a command to enter the C3 state transmitted by means of the operating system. After the CPU 10 receives the stop-clock signal and it is confirmed to enter the C3 state, the CPU 10 transmits a stop-grant signal (STPGNT) to the south bridge chip 60 to make the CPU 10 enter the C3 state. Thus, power consumption is reduced.

When the CPU 10 is in the C3 state and when the first host bridge 20 or the second host bridge 30 receives the bus master signals, because the first arbiter 25 and the second arbiter 35 are shut down at this time, the bus master signals cannot be transmitted to the CPU 10, and thereby cannot be further processed. However, the first host bridge 20 and the second host bridge 30 can still transmit the recording signals for the recorder 65 to record. By means of detecting the recorder 65 by the south bridge chip 60 when the CPU 10 enters the C3 state, the present invention is aware that the first host bridge 20 or the second host bridge 30 receives the bus master signals. Thereby, the step S6 has to be executed to force the CPU 10 to quit the C3 state so as to force the first host bridge 20 and the second host bridge 30 to be able to transmit the bus master signals to the CPU 10 by turn on the first arbiter 25 and the second arbiter 35, and then the bus master signals can be processed.

The step S6 according to the present invention utilizes the south bridge chip 60 to transmit a stop-clock-termination signal to the CPU 10 to wake up the CPU 10 that is in the C3 state and make it quit the C3 state. After the CPU 10 quits the C3 state, a turn-on command is transmitted to the first host bridge 20 via the operating system in order to force the first host bridge 20 to be able to transmit the bus master signals to the CPU 10. In addition, a control signal CS is transmitted to the second host bridge 30 to force the second arbiter 35 to be able to transmit the bus master signals to the CPU 10 as well, thereby the bus master signals can be provided to the CPU 10 for further processing. Then the first arbiter 25 and the second arbiter 35 are turned on.

Figure 3:
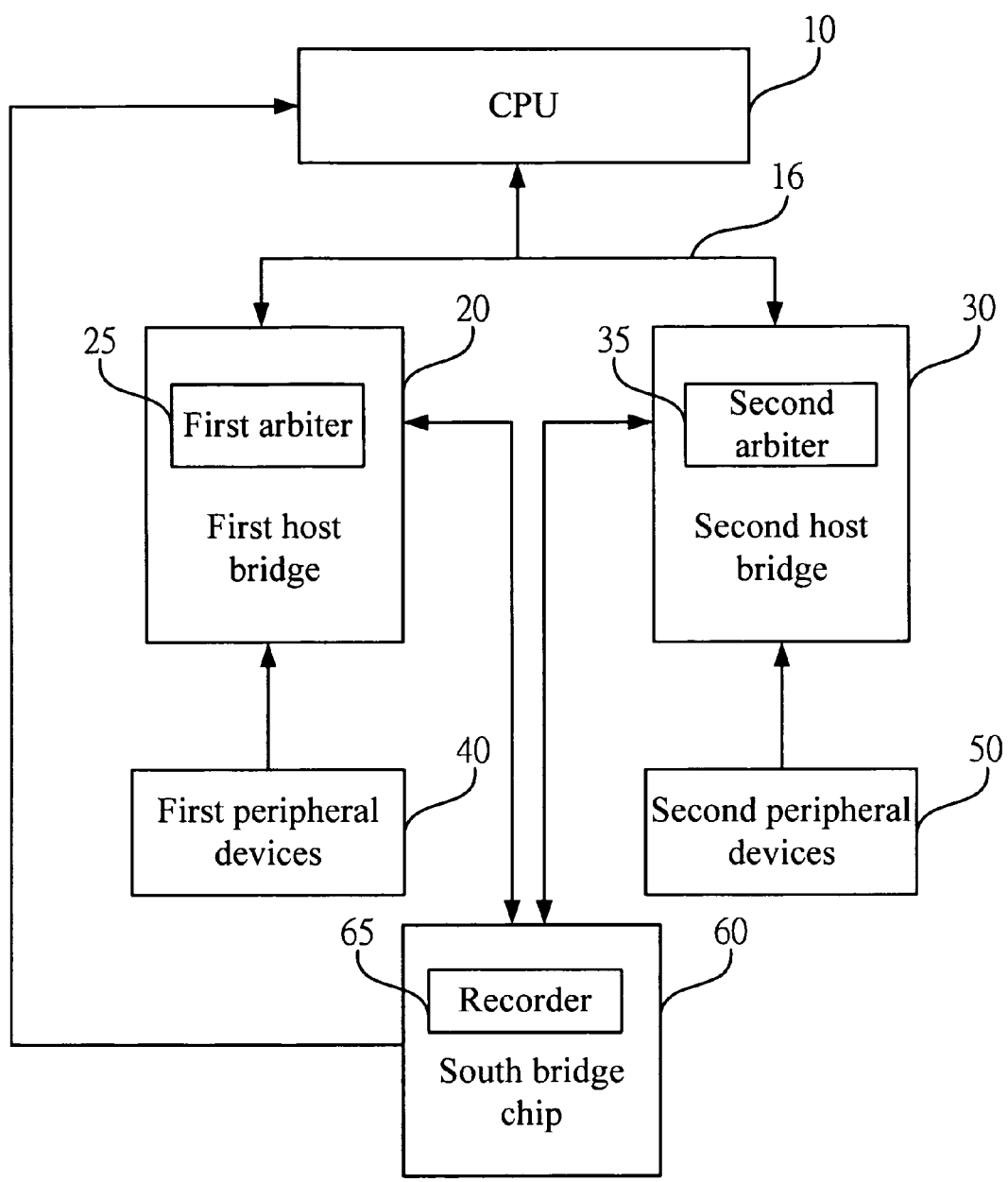
FIG. 3 shows a block diagram of another preferred embodiment according to the present invention.
Figure 4:
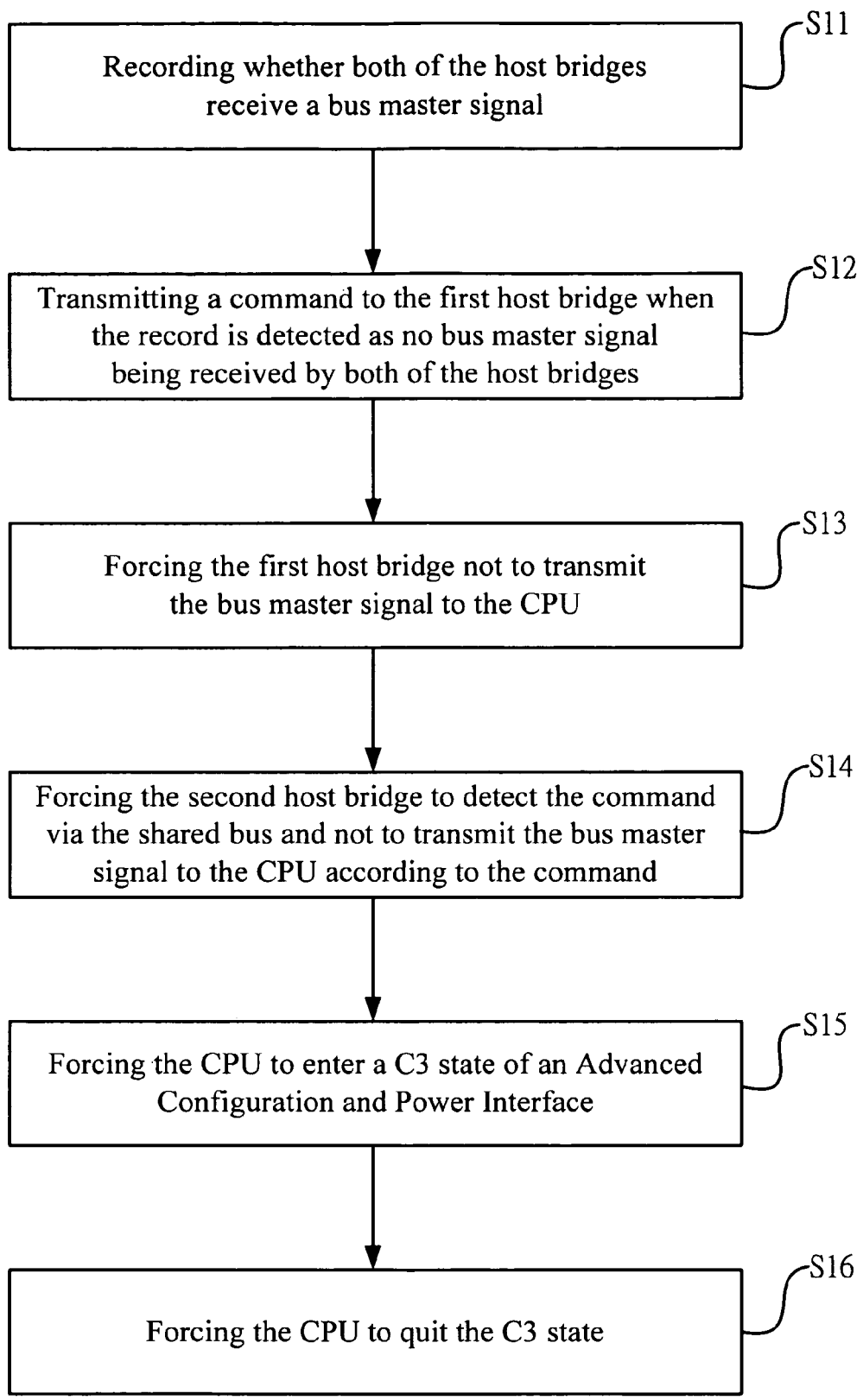
FIG. 4 shows a flowchart of another preferred embodiment according to the present invention.

Please refer to FIG. 3 and FIG. 4. As shown in FIG. 3, the difference between this embodiment and the embodiment shown in FIG. 1 is that the CPU 10 in this embodiment is provided with a shared bus 16. Thereby the first host bridge 20 and the second host bridge 30 connect to the CPU 10 by means of said shared bus 16. The other aspects of the embodiment of FIG. 3 are identical to that of FIG. 1. Another method of power management aiming at this architecture is provided by the present invention. As shown in FIG. 4, according to the step S11 and S12, whether the first host bridge 20 and the second host bridge 30 receive the bus master signals is recorded. When the record shows that the first host bridge 20 and the second host bridge 30 receive no bus master signals, a command is transmitted to the first host bridge 20 to execute the step S13. The step S13 forces the first host bridge 20 not to transmit the bus master signals to the CPU 10 when it receives the bus master signals. This step is different from the step S3 in the foregoing embodiment in that the first host bridge 20 does not transmit the control signal CS to the second host bridge 30.

The architecture of the present embodiment is that the first host bridge 20 and the second host bridge 30 are both connected to the shared bus 16, therefore the second host bridge 30 can detect commands through the shared bus 16 as shown in the step S14, and thus the second host bridge 30 can acquire the commands. Thereby, according to the command the second host bridge 30 is able not to transmit the bus master signals to the CPU 10 when it receives the bus master signals. Afterwards, the step S15 is executed to force the CPU 10 to enter the C3 state of the ACPI. After the CPU 10 enters the C3 state, when the first host bridge 20 or the second host bridge 30 receives the bus master signals by means of detecting the records, the step S16 is executed to force the CPU 10 to quit the C3 state. Then a turn-on command is transmitted to the first host bridge 20 via the operating system in order to turn on the first arbiter 25. Moreover, the second host bridge 30 can detect the turn-on command via the shared bus 16, and turn on the second arbiter 35 according to the turn-on command. Thereby the bus master signals can be transmitted to the CPU 10 for further processing by the CPU 10.

In addition, the architecture of FIG. 3 can also adopt the method of FIG. 2. In which method, the first host bridge 20 transmits the control signal CS to the second host bridge 30 in order to force the second host bridge 30 either to stop transmitting to or to transmit to the CPU 10 as it receives the bus master signals, respectively. Thereby, the CPU 10 is forced to enter or to quit the C3 state accordingly.

To sum up, the method of power management of a CPU connecting with a plurality of host bridges according to the present invention is applied to a CPU connecting to a plurality of host bridges. Because a command is transmitted to the first host bridge only, therefore in the case of a CPU connecting to a plurality of host bridges, the first host bridge has to transmit a control signal accordingly in order to control the operation of the other host bridges. In addition, the host bridges connected to a shared bus can make use of the shared bus to detect the command transmitted to the first host bridge by the operating system, and perform executions according to the command. Thereby, a computer system with a CPU connecting to a plurality of host bridges can support to make the CPU enter the C3 state of the ACPI to achieve the purpose of more perfect power management.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method of power management of a CPU connecting with a plurality of host bridges, comprising:
   transmitting a command to a first host bridge of the plurality of host bridges when the host bridges are detected as failing to receive bus master signals;
   forcing the plurality of host bridges to suspend transmission of the bus master signals to the CPU responsive to the command being received by the first host bridge, and a control signal being sent from the first host bridge to a second host bridge of the plurality of host bridges; and
   forcing the CPU to enter a C3 state of an Advanced Configuration and Power Interface (ACPI).

2. The method of claim 1, wherein the CPU is provided with a plurality of independent buses, and the first host bridge and the second host bridge are connected to the buses, respectively.

3. The method of claim 1, wherein the CPU is provided with a shared bus, and the first host bridge and the second host bridge are connected to the shared bus.

4. The method of claim 1, wherein the host bridges received the bus master signal is recorded in a recorder.

5. The method of claim 4, wherein the step of providing a recorder includes the step of providing the recorder in a south bridge chip of the computer system.

6. The method of claim 1, wherein the step of transmitting a command to a first host bridge of a plurality of host bridges includes the step of employing an operating system to detect the bus master signals sent to the plurality of host bridges, and the operating system then transmitting the command to the first host bridge when the host bridges are detected as failing to receive bus master signals.

7. The method of claim 1, wherein the step of forcing the first host bridge to suspend transmission of the bus master signals to the CPU when the first host bridge receives the bus master signal is to force the first host bridge to shut down an arbiter provided by the first host bridge such that the first host bridge is inhibited from transmitting the bus master signals to the CPU when the first host bridge receives the bus master signal.

8. The method of claim 1, wherein the step of forcing the CPU to enter the C3 state of the ACPI further comprises the steps of:
   employing an operating system to transmit a command of entering the C3 state to a south bridge chip of the computer system;
   forcing the south bridge chip to transmit a stop-clock signal to the CPU; and
   forcing the CPU to transmit a stop-grant signal to the south bridge chip, and forcing the CPU to enter the C3 state.

9. The method of claim 1, further comprising the step of forcing the CPU to exit the C3 state, and forcing the plurality of host bridges to resume transmitting the bus master signals to the CPU if at least one of the host bridges receives the bus master signal after the CPU enters the C3 state.

10. The method of claim 9, wherein a south bridge chip of the computer system is employed to transmit a stop-clock signal termination to the CPU in order to force the CPU to quit the C3 state, to transmit a turn-on command to the first host bridge via an operating system to enable the plurality of host bridges to resume transmitting bus master signals to the CPU, and to transmit the control signal to the second host bridge by the first host bridge in order to force the second host bridge to resume transmitting the bus master signals to the CPU.

11. A method of power management of a CPU connecting with a plurality of host bridges, the CPU is provided with a shared bus, said shared bus connecting to the host bridges, comprising:
   transmitting a command to a first host bridge of the plurality of host bridges when the host bridges are detected as failing to receive bus master signals;
   forcing the first host bridge to suspend transmission of bus master signals to the CPU responsive to the command being received by the first host bridge;
   forcing a second host bridge of the plurality of host bridges to detest the command via the shared bus and to suspend transmission of the bus master signal to the CPU responsive to the command when the second host bridge receives the bus master signal; and forcing the CPU to enter a C3 state of an Advanced Configuration and Power Interface (ACPI).

12. The method of claim 11, wherein the host bridges received the bus master signal is recorded in a recorder.

13. The method of claim 12, wherein the recorder is provided in a south bridge chip of the computer system.

14. The method of claim 11, wherein the step of transmitting a command to a fir St host bridge of the plurality of host bridges is to employ an operating system to detect the bus master signals sent to the plurality of host bridges, and the operating system then transmitting the command to the first host bridge when the host bridges are detected as no failing to receive bus master signals.

15. The method of claim 11, wherein the step of forcing the first host bridge to suspend transmission of the bus master signals to the CPU is to force the first host bridge to shut down an arbiter provided by the first host bridge such that the first host bridge is inhibited from transmitting the bus master signals to the CPU when the first host bridge receives the bus master signal.

16. The method of claim 11, wherein the step of forcing a second host bridge to detect the command via the shred bus and to suspend transmission of the bus master signal to the CPU responsive to the command when the second host bridge receives the bus master signal is to force the second host bridge to shut down an arbiter provided by the second host bridge responsive to the command such that the second host bridge is inhibited from transmitting the bus master signal to the CPU when the second host bridge receives the bus master signal.

17. The method of claim 11, the step of forcing the CPU to enter the C3 state of the ACPI further comprising:

employing an operating system to transmit a command of entering the C3 state to a south bridge chip of the computer system;

forcing the south bridge chip to transmit a stop-clock signal to the CPU; and forcing the CPU to transmit a stop-grant signal to the south bridge chip, and forcing the CPU to enter the C3 state.

18. The method of claim 11, further comprising the step of forcing the CPU to exit the C3 state, and forcing the plurality of host bridges to resume transmitting bus master signals to the CPU if at least one of the host bridges receives the bus master signal alter the CPU enters the C3 state.

19. The method of claim 18 wherein a south bridge chip of the computer system is employed to transmit a stop-clock termination signal to the CPU in order to force the CPU to quit the C3 state, to transmit a torn-on command to the first host bridge via an operating system to enable the first plurality of host bridges to resume transmitting the bus master signals to the CPU, wherein the second bridge detects the turn-on command via the shared bus to resume transmitting the bus master signal to the CPU according to the turn-on command.

* * * * *